US008836483B2

(12) United States Patent
Lin

(10) Patent No.: US 8,836,483 B2
(45) Date of Patent: Sep. 16, 2014

(54) OPTICAL REMOTE CONTROL SYSTEM AND LIGHT SOURCE CONTROL METHOD THEREFOR

(75) Inventor: Chun-Huang Lin, HsinChu (TW)

(73) Assignee: Chip Goal Electronic Corporation, R.O.C., Hsinchu (TW)

( * ) Notice: Subject to any disclaimer, the term of this patent is extended or adjusted under 35 U.S.C. 154(b) by 426 days.

(21) Appl. No.: 13/253,421

(22) Filed: Oct. 5, 2011

(65) Prior Publication Data

US 2013/0089334 A1 Apr. 11, 2013

(51) Int. Cl.
*G05B 11/01* (2006.01)
*G08C 19/16* (2006.01)

(52) U.S. Cl.
USPC ................ 340/12.24; 340/815.6; 340/815.54; 340/815.57; 340/815.67; 340/815.75; 340/619; 340/12.22; 340/815.69

(58) Field of Classification Search
CPC ... G06F 3/0346; G06F 3/03542; G08C 19/28; G06T 3/40; G06T 3/4007
USPC ........................................................ 340/12.24
See application file for complete search history.

(56) References Cited

U.S. PATENT DOCUMENTS

| | | | | |
|---|---|---|---|---|
| 8,345,002 | B2 * | 1/2013 | Lin et al. ........................ | 345/157 |
| 2007/0080940 | A1 * | 4/2007 | Aoki et al. ..................... | 345/158 |
| 2009/0051651 | A1 * | 2/2009 | Han et al. ...................... | 345/158 |

* cited by examiner

*Primary Examiner* — George Bugg
*Assistant Examiner* — Anthony D Afrifa-Kyei
(74) *Attorney, Agent, or Firm* — Tung & Associates

(57) ABSTRACT

The present invention discloses an optical remote control system, and a method for controlling a light source of the system. The system includes: a light source including a plurality of lighting units, the light source generating at least one light beam; an image sensor receiving an image including the light beam; and a processor determining a number or positions of the lighting units which are activated according to an area of the light beam in the image.

9 Claims, 5 Drawing Sheets

OPTICAL REMOTE CONTROL SYSTEM AND LIGHT SOURCE CONTROL METHOD THEREFOR

BACKGROUND OF THE INVENTION

1. Field of Invention

The present invention relates to an optical remote control system and a light source control method therefor, in particular to such optical remote control system and light source control method which are capable of modulating a light source for better orientation.

2. Description of Related Art

Many current interactive video game systems provide users with joysticks or remote controllers so that the users can play the games by actions, e.g. to drive a race car, to swing a golf club, etc. Such joystick or remote controller typically includes a gyro, an accelerometer, or an image sensor. In a joystick or remote controller which employs the image sensor, the image sensor senses images and generates information for controlling the movement of a cursor or a pointer on a screen, or for selecting an icon to execute a corresponding function or program, etc.

FIG. 1A shows a schematic diagram illustrating the use of a joystick in a prior art interactive video game system. The orientation of the joystick 11 is identified according to the images captured by the image sensor 111. That is, the positions of the light beams from the multiple lighting units 131 of the light source 13 in the images captured by the image sensor 111 are used to confirm the orientation of the joystick 11 such that, e.g., a cursor 141 on the display 14 is accurately moved from the left side to the right side. Referring to this figure, the light source 13 comprises six lighting units 131 which are all turned on to light during operation of the game system, to form one light spot in the image captured by the image sensor 111. However, if the distance between the joystick 11 (or the image sensor 111) and the light source 13 is too short, the light beams from the multiple lighting units 131 form a bigger light spot in the image captured by the image sensor 111, and the short distance may cause overexposure such that it is hard to recognize the light spot in the captured image. On the contrary, if the distance between the joystick 11 and the light source 13 is too far, the light spot formed by the light beams from the lighting units 131 in the image captured by the image sensor 111 is likely to be too small and hard to be recognized. Therefore, the distance between the conventional joystick 11 and the light source 13 needs to be kept within a proper workable range, otherwise the light spot in the captured image is oversize or undersize.

FIGS. 1B-1C show schematic diagrams illustrating the light spot in the image captured by the image sensor. Referring to FIG. 1B, when the distance between the image sensor and the light source is L, the width of the visible region resulting from the visible angle 152 of the image sensor is W, and the light spot 151 in the image 15 covers four pixels. Referring to FIG. 1C, when the distance between the image sensor and the light source is 2 L, the width of the visible region resulting from the visible angle 152' of the image sensor is 2 W, and the light spot 151' in the image 15' covers two pixels. If the recognizable range of the light spot is 2-4 pixels, then the light spot is not recognizable if it covers less than two pixels or more than four pixels. This means that the operating distance of the prior art is L–2 L. If the operating distance is smaller than L or larger than 2 L, the system cannot properly respond.

The limited operating distance or operating range is disadvantageous; the light spot is smaller than the required minimum size and cannot be recognized when the distance is longer than the maximum operating distance, and the light spot image is larger than the required maximum size and cannot be recognized when the distance is shorter than the minimum operating distance. If the size of the light spot is enlarged to increase the maximum operating distance, the minimum operating distance is adversely affected. On the contrary, if the size of the light spot is decreased to shorten the minimum operating distance, the maximum operating distance of the light spot image is also shortened.

In view of above, the present invention overcomes the foregoing drawbacks by providing an improved optical remote control system and a light source control method. The operating distance of the optical remote control system can be enlarged by adjusting the number and the positions of the lightened units of the light source for the orientation. The light spot becomes recognizable more accurately in a wider range, and the lighting units can be controlled in an optimal way to effectively save the power of the light source.

SUMMARY OF THE INVENTION

An objective of the present invention is to provide an optical remote control system.

Another objective of the present invention is to provide a method for controlling a light source of an optical remote control system.

To achieve the foregoing objectives, in one aspect, the present invention provides an optical remote control system, comprising: a light source including a plurality of lighting units, the light source generating at least one light beam; an image sensor receiving an image including the light beam; and a processor determining a number or positions of the lighting units which are activated according to an area of the light beam in the image.

In one embodiment of the foregoing optical remote control system, the area of the image of the light beam is represented by a number of pixels of the image, and the processor reduces the number of the lighting units which are activated when the number of pixels is larger than a first threshold; the processor increases the number of the lighting units which are activated when the number of pixels is smaller than a second threshold.

In one embodiment of the foregoing optical remote control system, the light source changes the number and/or the positions of the lighting units which are activated according to a predetermined rule.

In the foregoing optical remote control system, the light beam emitted from the lighting units can occupy a single area or multiple separated areas in the image received by the image sensor.

In the foregoing optical remote control system, when the lighting units are not all activated at the same time, the light source preferably changes the positions of the lighting units which are activated in a predetermined order.

In yet another aspect, the present invention provides a method for controlling an optical remote control system, the optical remote control system comprising a light source including a plurality of lighting units and an image sensor, the method comprising: generating at least one light beam from the light source; receiving an image including the light beam; and determining a number or positions of the lighting units which are activated according to an area of the light beam in the image.

The objectives, technical details, features, and effects of the present invention will be better understood with regard to the detailed description of the embodiments below, with reference to the drawings.

DESCRIPTION OF THE PREFERRED EMBODIMENTS

The optical remote control system and light source control method according to the present invention are applicable to computers, video players or interactive game systems, such as for moving a pointer on a display of a computer monitor, remote-control of a video player, remote-control of a smart TV, etc. Because an interactive game system is currently popular, it is taken as an example in the following description.

Figure 1A:
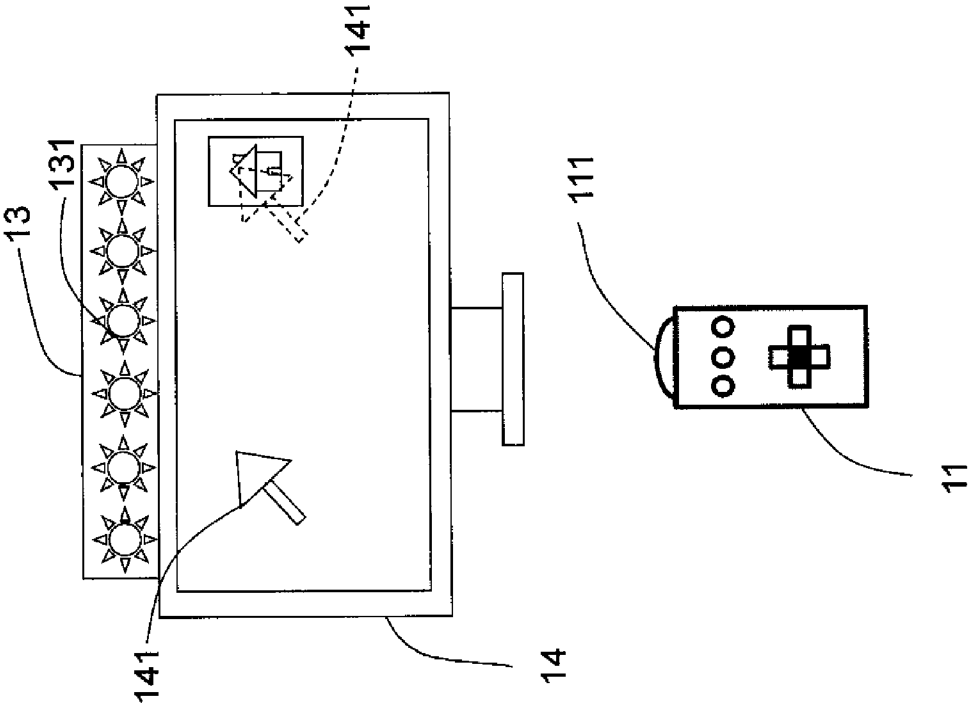
Fig. 1A (Prior Art)
FIG. 1A shows a schematic diagram illustrating the use of a joystick in a prior art interactive video game system.
Figure 1C:
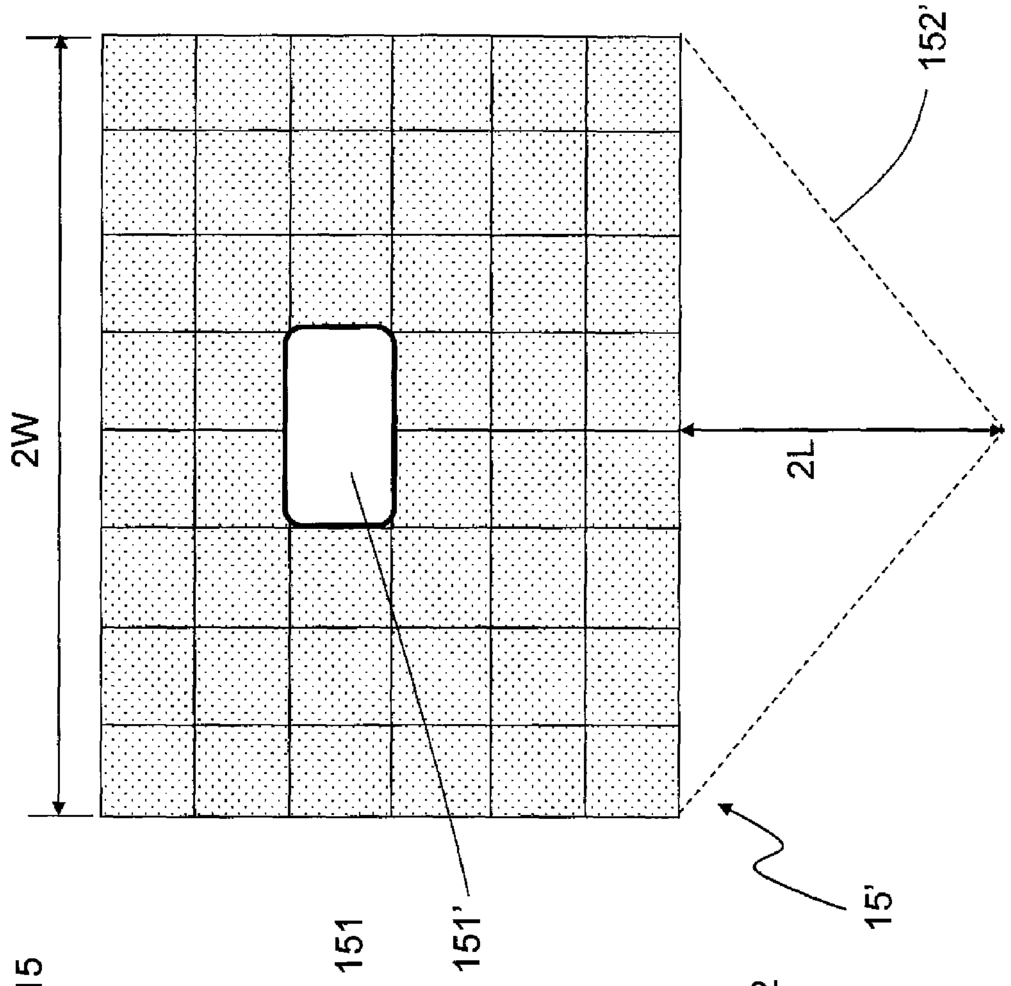
Fig. 1C (Prior Art)
FIGS. 1B-1C show schematic diagrams illustrating the light spot in the image captured by the image sensor.
Figure 1B:
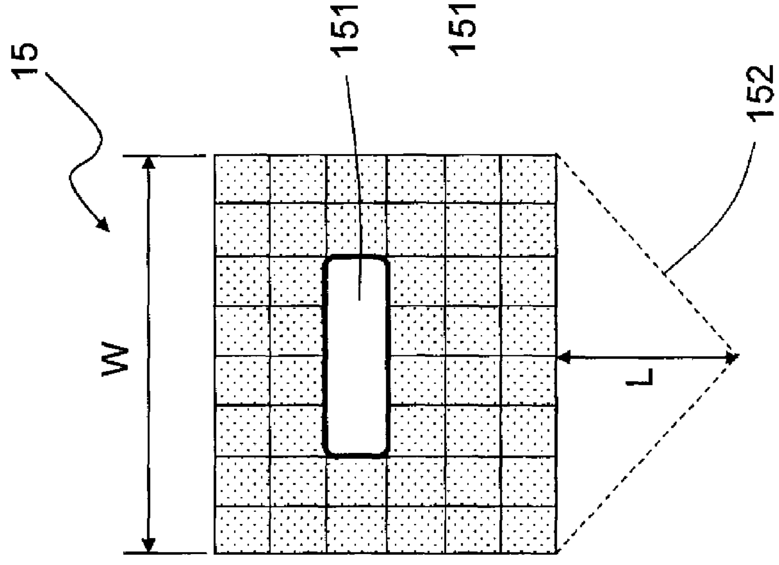
Fig. 1B (Prior Art)
Figure 2A:
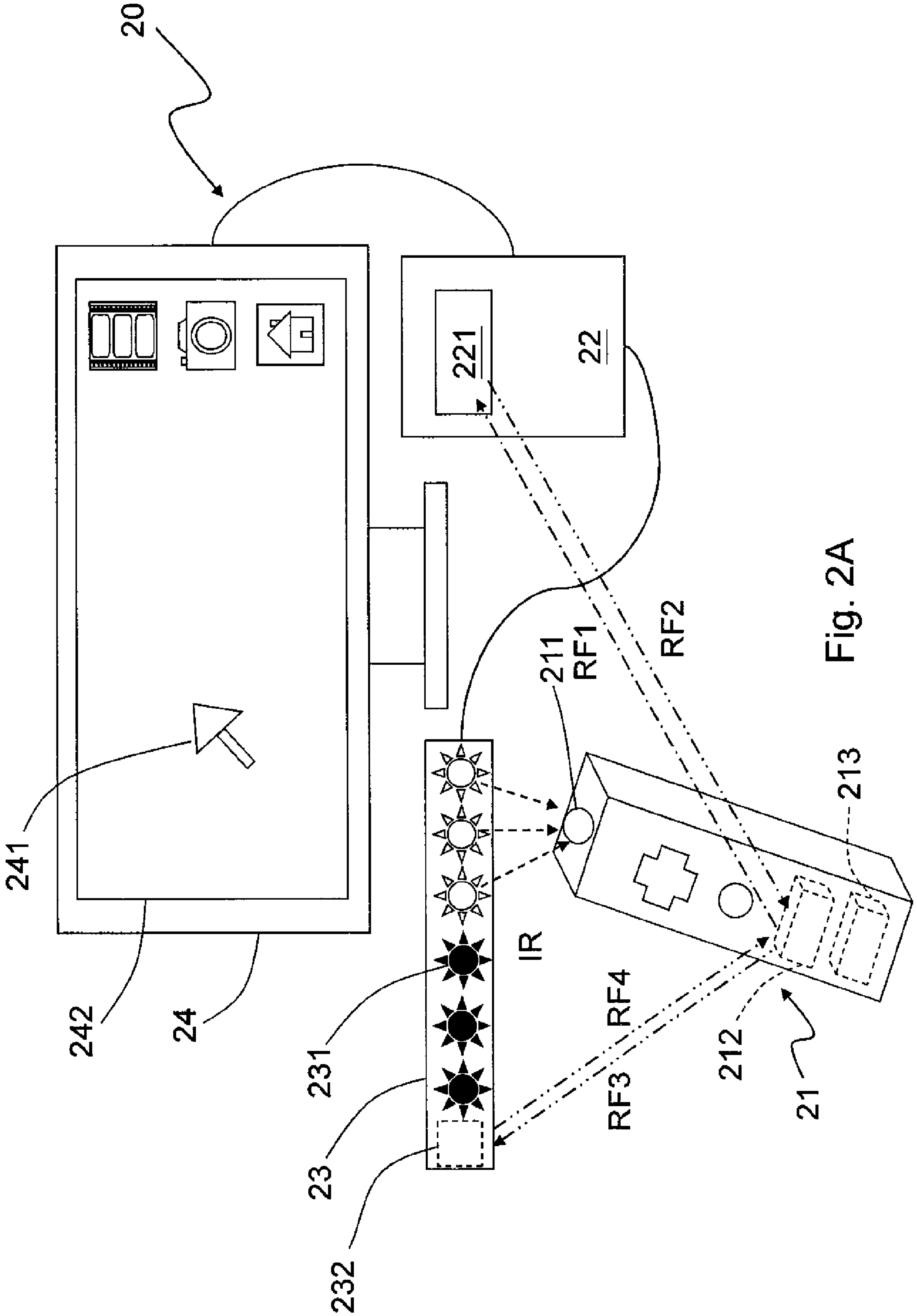
FIG. 2A shows a schematic diagram illustrating an optical remote control system of the present invention.

FIG. 2A shows a schematic diagram illustrating an optical remote control system of the present invention. As shown in this figure, the wireless remote control image display system 20 basically comprises a controller 21, a game host 22, a light source 23, and an image display 24. The game host 22 executes a video game program which is shown by the image display 24. The image display 24 may be a screen, a projector, a head-mounted display, or other types of display apparatuses. A user operates the controller 21 to interact with the game host 22 such that the game host 22 executes various actions or instructions such as moving a pointer or a cursor 241 on the image display 24 to the menu at the right side. The light source 23 includes multiple lighting units 231, each of which can be individually controlled to be turned on or turned off. The light source 23 may be, but not limited to, an infrared light source.

When the controller 21 is operated by the user, the lighting units 231 of the light source 23 generate one or multiple infrared (IR) rays which are imaged in the image sensor 211 of the controller 21. In this embodiment, the processor 213 is disposed in the controller 21, but it can be disposed in the game host 22 in another embodiment. The game host 22 includes a transceiver 221, which communicates with the transceiver 212 of the controller 21 through the radio frequency signals RF1 and RF2 (or IR signals) for bidirectional data transmission. In addition, the transceiver 212 of the controller 21 also can communicates with the transceiver 232 of the light source 23 through the radio frequency signals RF3 and RF4 (or IR signals) for bidirectional data transmission. In other embodiments, the aforementioned data transmission can be conducted in a wired way.

In the prior art, all lighting units of the light source are turned on concurrently. However, when the distance between the light source and the image sensor is smaller than a minimum operating distance, the light spot is too large and cannot be recognizable. In the current embodiment, the processor 213 instructs the light source 23 to adaptively adjust the number of the lighting units 231 which are activated according to the information of the light spot in the captured image. That is, when the light spot is larger than the required size and covers too many pixels, the processor 213 sends a signal to the light source 23 to reduce the number of the turned-on lighting units 231, until the processor 213 determines that the light spot covers a proper pixel area. Referring to FIG. 2A, three of the six lighting units 231 are turned on, and the other three are turned off, so that the image sensor 211 can capture an image in a shorter distance to the light source 23. The adjustment instruction can be communicated in various ways, depending on where the processor 213 is located. For example, the processor 213 can send the instruction to the light source 23 directly, through the radio frequency signal RF3, or indirectly, to the game host 22 (such as when the processor 213 is located in the game host 22) and the game host 22 sends the instruction to the light source 23.

Figure 2B:
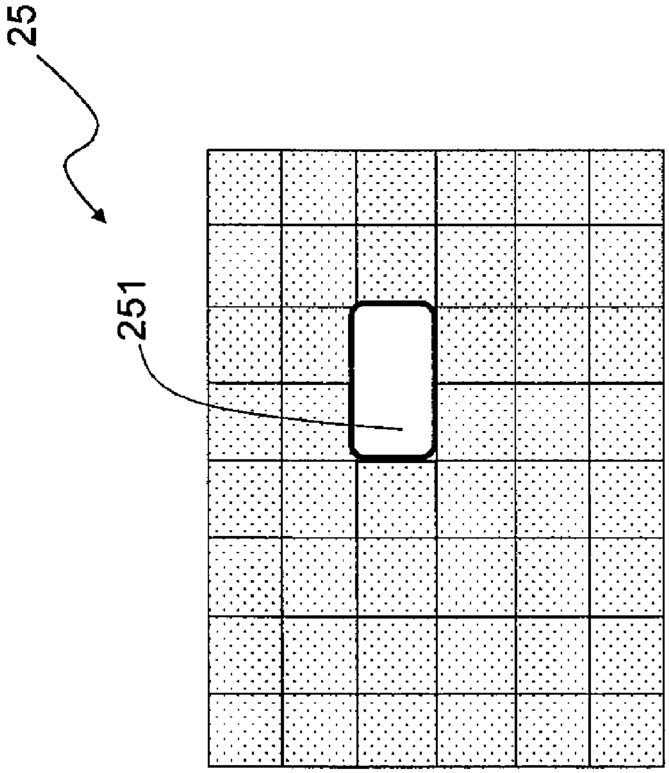
FIG. 2B shows a light spot in an image captured by the image sensor in FIG. 2A.

FIG. 2B shows a lighting spot in an image captured by the image sensor in FIG. 2A. Because three of the lighting units 231 in FIG. 2A are turned on, the light spot 251 in the image 25 covers two pixels (in the current embodiment, it is assumed that the preferable size is 2-4 pixels). In response to the distance change between the image sensor 211 and the light source 23, the number of the lighting units 231 which are activated can be adjusted in order to obtained a better light spot 251 (preferable pixel number). When the user increases the distance between the controller 21 and the light source 23, the light spot becomes smaller or vague, for example occupying only one pixel. In response, the number of the turned-on lighting units 231 can be increased. For example, six of the lighting units 231 are all turned on to keep the size of the light spot to be 2-4 pixels. Thus, the number of the lighting units 231 which are activated is dynamically adjusted; as a result, the operating distance of the optical remote control system can be extended and the electrical power can be effectively saved. That is, although the light spot covering 2-4 pixels can be recognized, it can be controlled so that the light spot only covers an area of the minimum required pixel number (two pixels in this embodiment); in this way the number of the lighting units 231 which are activated is reduced and the electrical power is saved.

Furthermore, when the lighting units are not activated all at the same time, the light source 23 can change the positions of the lighting units 231 which are activated in a predetermined order after a period of time. This can prolong the lifetime of the lighting units.

That the lighting units 231 of the light source 23 can be individually controlled provides benefits that the image sensor 211 can obtain an optimal image and the electrical power can be effectively saved. In addition to such benefits, the lighting units 231 of the light source 23 can be individually controlled for identification or for other functions. The lighting units 231 of the light source 23 can be selectively turned on according to a predetermined rule. For example, the number and/or the positions of the lighting units 231 which are activated are sequentially changed after a certain interval (e.g., 1 second). Such alternating lighting can be used as a communication protocol between the light source 23 and the controller 21, for functions such as expressing a request to initializing communication, a position confirmation, or any other specific request. An application of such communication may when the controller 21 receives sequential images according to a predetermined rule, it can confirm the identity of the light source and determines whether to start communication with the light source, or to filter undesired interference light if the images do not express a defined protocol. For example, when the light source 23 is interfered by other surrounding light sources, the controller 21 cannot identify which light spot in the image 25 corresponds to the light source 23 that the image sensor 211 intends to receive light from. In this case, the controller 21 can send an identification request to the light source 23, such as to regularly and sequentially activate the lighting units 231, for position confirmation.

Figure 3A:
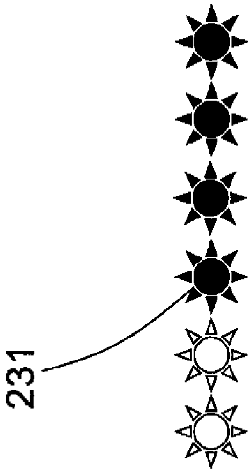
FIG. 3A is a schematic diagram illustrating the lighting units of the light source which are activated.
Figure 3B:
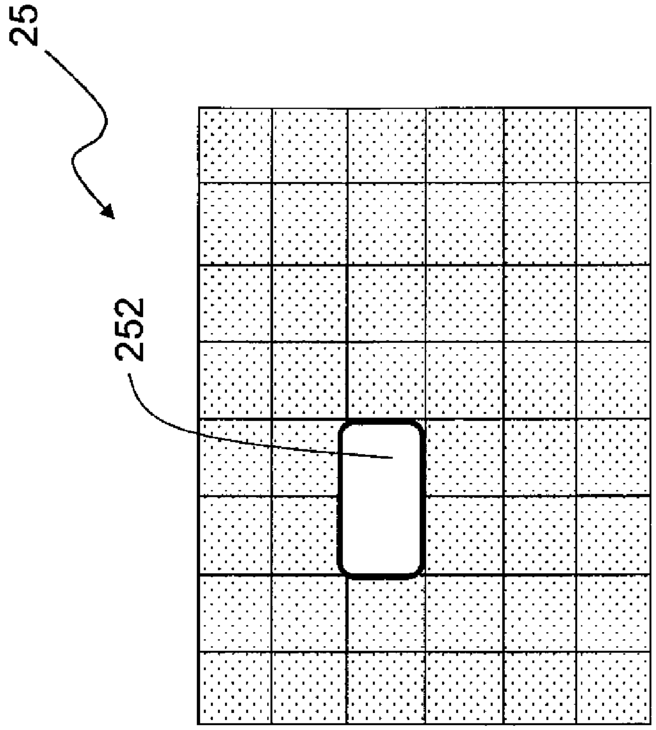
FIG. 3B shows a light spot in an image captured by the image sensor in FIG. 3A.

In addition to the foregoing benefits, that the lighting units 231 of the light source 23 can be individually controlled can be used to provide other control functions. FIG. 3A is a schematic diagram illustrating the lighting units of the light source which are activated. The two left lighting units 231 are activated, and the four right ones are inactivated. Referring to FIG. 3B, because the lighting units 231 are activated in the manner as shown in FIG. 3A, the light spot 252 covers two pixels in one area in the image 25. The light spot 252 can be used for detecting a two dimensional movement of the controller 21, such as for controlling the movement of the cursor 241 on the image display 24. That is, the light source 23 generates a single light spot under this condition.

Figure 4A:
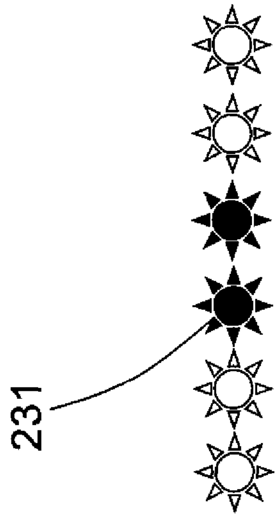
FIG. 4A is a schematic diagram illustrating the lighting units of the light source which are activated.
Figure 4B:
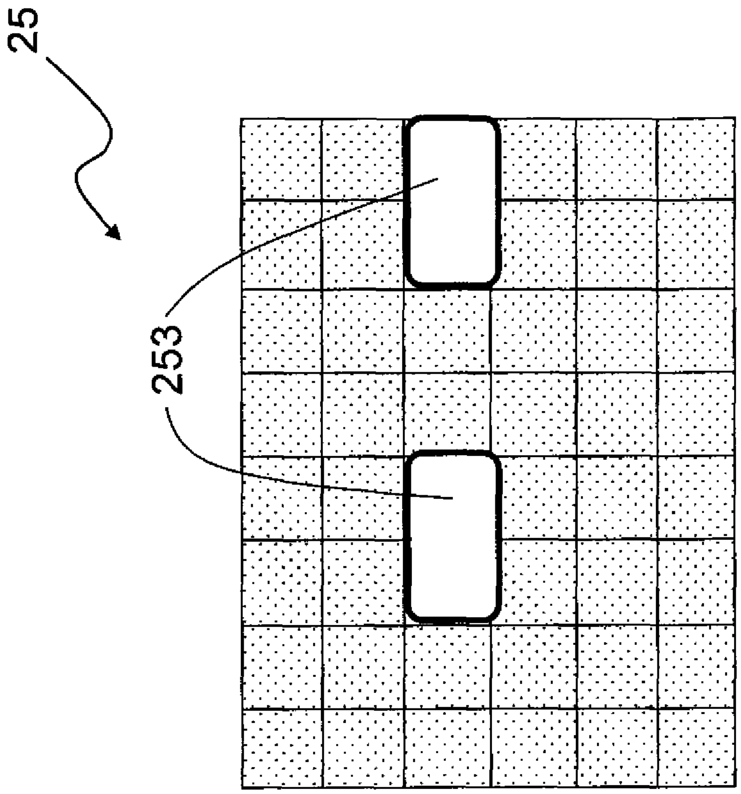
FIG. 4B shows two light spots in an image captured by the image sensor in FIG. 4A.

FIG. 4A is a schematic diagram illustrating the lighting units of the light source which are activated. The two left and two right lighting units 231 are activated, and the two middle ones are turned off. Referring to FIG. 4B, because the lighting units 231 are activated in the manner as shown in FIG. 4A, the image 25 includes two light spots 253, each covering two pixels, with two dark pixels in between. That is, the light source 23 forms multiple light spots. The two light spots 253 can be used for detecting a three dimensional movement of the controller 21. When the controller 21 moves closer and farther relative to the light source (out-of-plane movement), the distance between the two light spots 253 is changed, and the change can be used to calculate the displacement in the out-of-plane direction. The three dimensional movement of the controller 21 can be used to rotate an object on the image display 24 or to control the object to make a three dimensional movement.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, the positions of the light source 23 and the image sensor 211 can be exchanged, and the image sensor 211 does not necessary have to be disposed in the controller 21. For another example, the controller 21, the game host 12, and the light source 23 can commute with each other in a wired or wireless manner not limited to the manner as shown in the drawings. Furthermore, multiple thresholds can be set to confine the pixel number of the light spot. For example, a first threshold is set which defines the maximum pixel number, and if this threshold is reached, the system reduces the number of the lighting units which are activated; a second threshold is set which defines the minimum pixel number of the recognizable pixel area, and if this threshold is reached, the system increases the number of the lighting units which are activated. Thus, the present invention should cover all such and other modifications and variations, which should be interpreted to fall within the scope of the following claims and their equivalents.

What is claimed is:

1. An optical remote control system, comprising:

a light source including a plurality of lighting units, the light source generating at least one light beam;

an image sensor receiving an image including the light beam; and a processor determining a number or positions of the lighting units which are activated according to an area of the light beam in the image, wherein the area of the light beam in the image is represented by a number of pixels in the image, and the processor reduces the number of the lighting units which are activated when the number of pixels is larger than a first threshold, or increases the number of the lighting units which are activated when the number of pixels is smaller than a second threshold.

2. The optical remote control system of claim 1, wherein the light source changes the number and/or the positions of the lighting units which are activated according to a predetermined rule.

3. The optical remote control system of claim 1, wherein the light beam emitted from the lighting units occupies a single area or multiple separated areas in the image received by the image sensor.

4. The optical remote control system of claim 1, wherein when the lighting units are not all activated at the same time, the light source changes the positions of the lighting units which are activated in a predetermined order.

5. The optical remote control system of claim 1, wherein one of the light source and the image sensor is disposed in a controller.

6. A method for controlling a light source of an optical remote control system, the optical remote control system comprising an image sensor and a light source including a plurality of lighting units, the method comprising:

generating at least one light beam from the light source;

receiving an image including the light beam;

determining a number or positions of the lighting units which are activated according to an area of the light beam in the image, wherein the area of the light beam in the image is represented by a number of pixels in the image; and reducing the number of the lighting units which are activated when the number of pixels is larger than a first threshold or increasing the number of the lighting units which are activated when the number of pixels is smaller than a second threshold.

7. The method for controlling a light source of an optical remote control system of claim 6, wherein the light source changes the number and/or the positions of the lighting units which are activated according to a predetermined rule.

8. The method for controlling a light source of an optical remote control system of claim 6, wherein the light beam emitted from the light source occupies a single area or multiple separated areas in the image.

9. The method for controlling a light source of an optical remote control system of claim 6, wherein when the lighting units are not all activated at the same time, the light source changes the positions of the lighting units which are activated in a predetermined order.

* * * * *